May 1, 1934.                J. ROBINSON                 1,956,878
                    AUTOMATIC TRAIN PIPE COUPLING HEAD
                    Filed Dec. 23, 1930        2 Sheets-Sheet 2
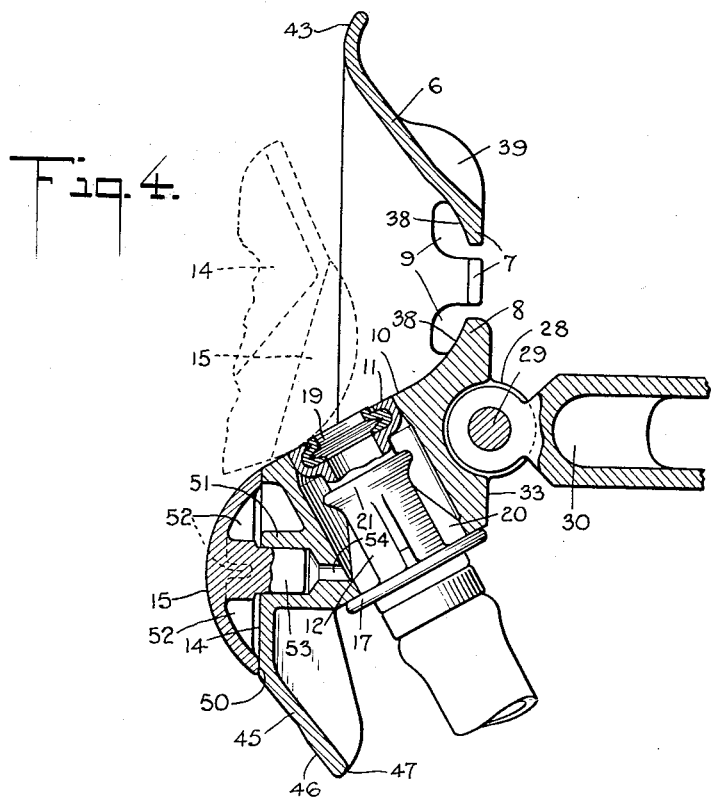
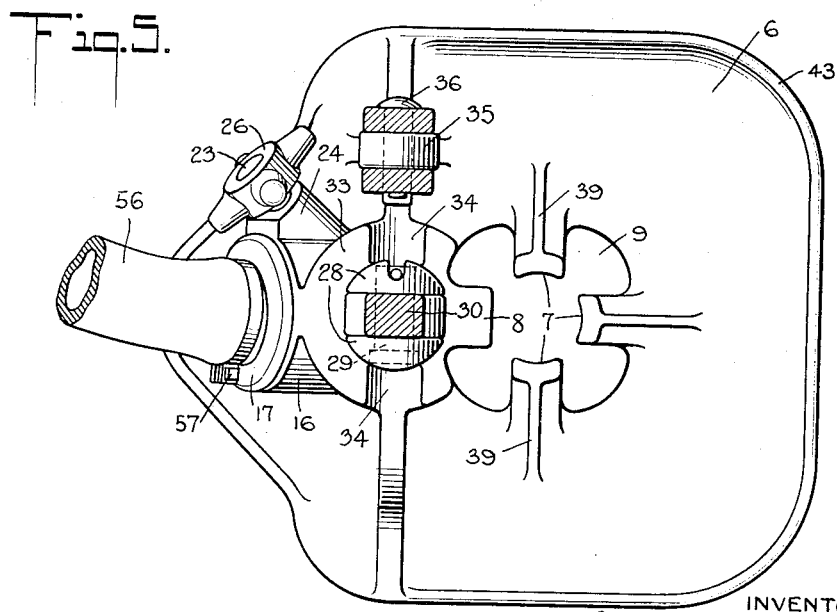
INVENTOR
Joseph Robinson,
BY
Watson, Coit, Morse & Grindle
ATTORNEYS Patented May 1, 1934

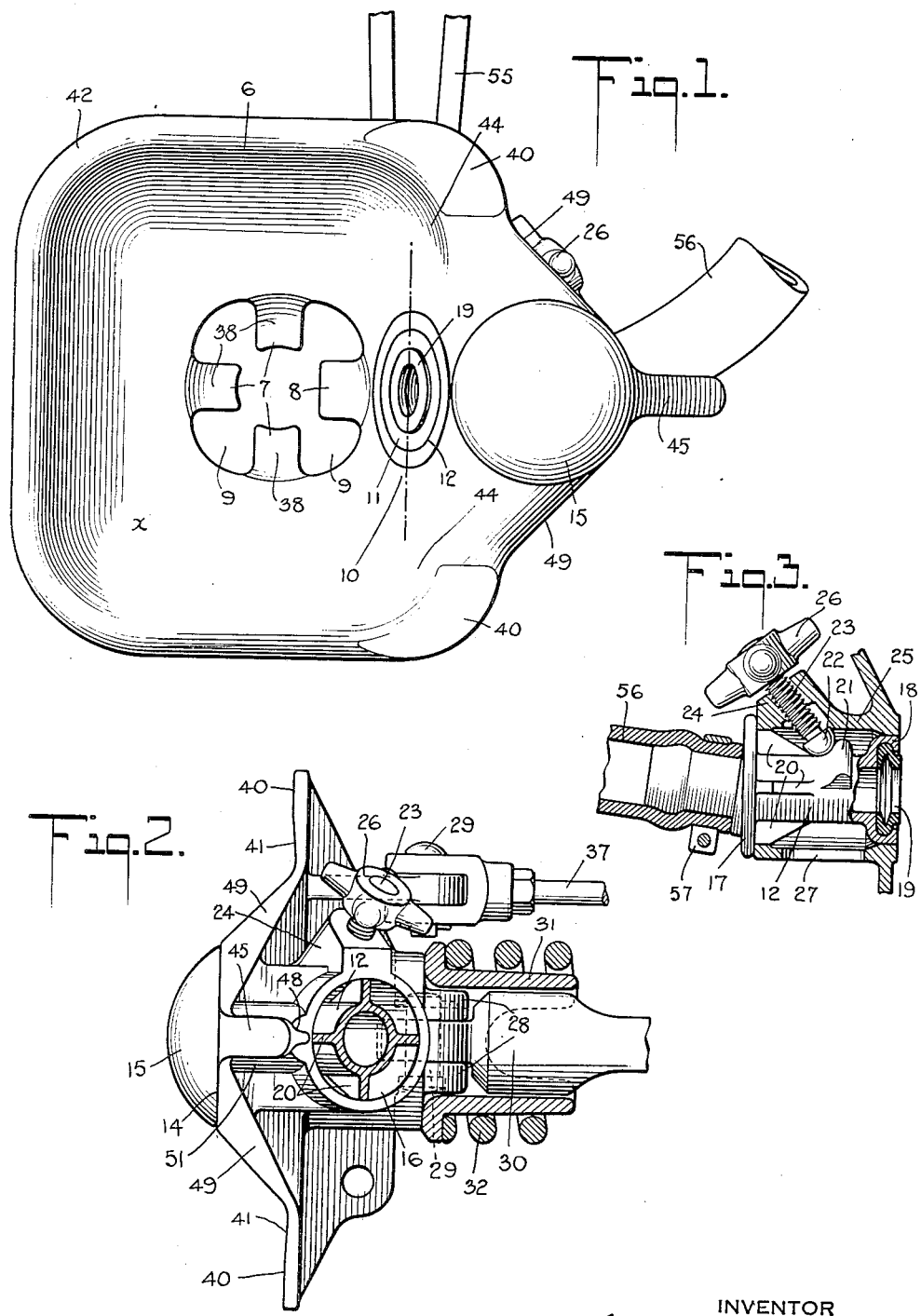

1,956,878

UNITED STATES PATENT OFFICE 1,956,878

AUTOMATIC TRAIN PIPE COUPLING HEAD

Joseph Robinson, New York, N. Y., assignor of one-half to Roy M. Wolvin, Montreal, Quebec, Canada Application December 23, 1930, Serial No. 504,405

3 Claims. (Cl. 285—58)

This invention relates to automatic train pipe couplings, and more particularly to improvements in the coupling head of such devices. Among the objects are to provide a coupling head of the pin and funnel type, in which the air is conveyed therethrough at an angle to the longitudinal axis of the head, that is characterized by unusual compactness, great gathering range and strength; to provide the head with a shallow funnel and a short blunt nose or horn formed by continuing one of the inner flaring walls of the funnel forwardly and thence curving it into a stubby blunt integral nose, or turning it at substantially a right angle to the longitudinal axis of the head to form a base for receiving a separately formed stubby blunt nose of suitable material hardened or not as preferred; to provide the horn or pin with a laterally extending guide prong or pilot to facilitate alignment of the head under extreme horizontal curves or other disalignments; to provide against snow and ice accumulating in the funnel to interfering extents; to convey the air through the head by means of a separately formed fitting removably secured in the head by a rugged locking device of novel form; to form the front face of the funnel so that when car couplers slip by to an extent that opposing funnels overlap, critical or excessive "biting" or sticking of the meeting surfaces of the funnels will be avoided, and to pivotally mount the coupling head upon its supporting apparatus in such a way that in coupler slip-bys the coupling head may escape damage by rotating on its support.

In the drawings Figure 1 is a front elevation of my improved coupling head. In this view the train pipe hose and a part of the supporting bracket are shown;

Figure 2 is a side elevation of my improved coupling head showing in section the rear portion of the conduit 12 and a part of the supporting apparatus;

Figure 3 is a section through the housing or barrel in which the conduit 12 of my improved coupling head is removably supported;

Figure 4 is a sectional plan view through my improved coupling head. In this view a part of the supporting apparatus is shown, and Figure 5 is a rear elevation of my improved coupling head.

As will be observed particularly in Figures 1 and 4 my improved head consists of a funnel member 6 relatively very shallow in depth longitudinally of the car, and of relatively wide lateral spread in face view. As shown, the depth is less than one half the distance across the mouth of the funnel. This gives distinct abruptness to the inner walls of the funnel which facilitates exclusion from the funnel of foreign substances such as snow and ice. To further prevent interfering accumulation of foreign elements in the funnel I provide the latter at its apex, and between powerful spaced bearing lugs 7 and 8, with quite large openings 9 which form exits for snow and ice. The face, or inner wall 10 of the funnel is preferably disposed in the vertical plane to an extent sufficient at least to equal the area of the face 11 of the conduit 12. The wall terminates at its forward portion in a transversely disposed base or seat 14 which suitably receives, as by being pressed therein, the stubby blunt nose 15, forged or cast of suitable material and preferably machined and hardened. Or the wall may continue on and terminate in the nose 15 in which case the nose would, of course, be integral with the head. The nose is short and blunt so as to be received in the shallow funnel of a mating head. At its other end the wall 10 terminates in the bearing lugs 7 and 8. Extending rearwardly from the vertically arranged face 10, and integral with the head, I provide a housing or chamber 16 for removably receiving the conduit 12. The conduit is provided with an annular flange or stop 17 at its rear portion, and at its forward end it is provided with a grooved head 18 in which is mounted an expansible gasket 19. The forward end of the conduit is preferably disposed in approximately the plane of the face 10, with the gasket projecting slightly beyond such plane. At its rear portion, and joining the flange 17, the conduit is provided with guides or spacers 20, and between these, and its forward end, it is provided with a semi-annular shoulder or lug 21 against which the forward enlarged end 22 of the plunger 23 bears. The plunger is threadingly or otherwise mounted in a lug 24 formed integral with the upper or other side of the housing or barrel 25. As the lug is threaded forward it shifts the fitting or conduit 12 towards the face 10 of the coupling head and into the service position shown in Figure 3. During this movement the spacers or bearing lugs 20 support the rear end of the conduit and facilitate its sliding movement in the housing or nipple 25, the flange 17 serving as a stop, on engagement with the housing, to limit the forward movement of the conduit to the predetermined service position described. The front end 22 of the plunger is given a greater diameter than the threaded portion thereof to prevent the plunger backing out of its receiving lug 24. The plunger is assembled in the lug from the inside of the housing after which the winged nut 26 is riveted to the outside rear end of the plunger. This arrangement affords a powerful means for removably locking the conduit 12 in the chamber and for permitting removal of the gasket 19 from between the mated faces of coupled heads while the heads remain together. It also provides an efficient means for gradually releasing the joint formed between mating gaskets, thus permitting such air as may be in the conduit, when renewal of the gasket is being effected to escape gradually thereby avoiding the injury to trainmen that might result from suddenly releasing the conduit 12 while heavily charged with air.

At its lower side the chamber is provided with an elongated opening 27 to permit exit of such foreign substances as may gather therein. Effective protection against accumulation in the chamber of foreign substances is provided by the flange 17 which also serves to close the rear end of the chamber, the front end thereof being closed by the gasket end 18 of the conduit 12.

Between the chamber or housing 25, and the apex of the funnel, I provide a pair of vertically spaced rearwardly extending perforated lugs or projections 28 which suitably receive, preferably pivotally receive as by a pin 29, a supporting member or stem 30. The member terminates at its forward end in an integral head or eye placed between the projections 28 and through which the pin 29 passes. A housing or sleeve 31 is slidably mounted on the forward portion of the supporting member 30 and extends over the lugs or projections 28. A suitable supporting spring 32 surrounds the sleeve and yieldingly urges it forward against the annular seat 33 formed on the rear side of the head and the lug 8. The seat is interrupted at 34, Figures 2 and 5, by a semi-circular recess or depression to receive the pin 29. The seat 33 is preferably in the plane of the axis of the pin 29.

Extending rearwardly from the head and formed integral therewith or otherwise secured thereto I provide an anchoring lug 35 to which is pivotally connected, as by a pin 36, a suitable support rod 37, the axis of the pivotal connection of the rod to the lug being preferably in the plane of the seat 33. On their front face the spaced rugged lugs 7 and 8 are provided with rearwardly offset seats or bearings 38 which receive the blunt noses 15 of opposing heads and align them, with their walls 10, and the face 11 of the fitting 12, slightly apart. The lugs are powerfully reinforced by the ribs 39 which span the point of connection of the lugs to the appex of the funnel 6. The inner lug 8 acts as a bearing or rocker arm for continued engagement with the front face of the sleeve 31 when the head is pivoted to the left, viewed from the front. Cooperating with the bearing lugs 7 and 8, and with the horn 14 of the head, to properly position mating heads, are bearing surfaces or lugs 40 arranged at the top and bottom of the head as shown. These surfaces project slightly in advance of a vertical plane intersecting the longitudinal center line of the conduit 12 at its front face, and lie partly in said plane and thence taper or flare into the face of the head as shown at 41. This taper is provided to prevent the top of one head fouling beneath the bearing point 40 of the other head when coupling under considerable vertical disalignment.

When car couplers slip by on the knuckle side the funnels 6 of opposing coupling heads overlap, if the slip-by is of appreciable extent, which it invariably is. If the slip-by occurs between cars the couplers of which are considerably disaligned vertically, the upper corner 42 of the low head tends to dig into the wall of the high head at about the point X, depending of course upon the extent of vertical disalignment. To minimize "biting" or sticking of these surfaces when they meet, I roll the front edge of the funnel rearwardly around a considerable radius as shown at 43.

It will be noted particularly in Figures 1 and 2 that the longitudinal axis of the head intersects the longitudinal axis of the conduit 12 at approximately the face 11 of the latter. In Figure 1 is best illustrated the extent to which the upper portions 44 of the walls of the funnel, at points above and below the face 10 of the head, flare towards the horn 14 beyond the vertical center of the head. This is a particularly advantageous shape for these walls for the reason that in service the nose 15 of the horn 14 engages the upper bearing surface 40 of an opposing head at a point to the right of the vertical center line of such head. Unless the walls of the funnel at this point flare to the right of such center line a considerable extent, the heads will foul and refuse to couple. But with these surfaces arranged as shown in Figure 1 accurate and dependable coupling of the heads under extreme conditions of disalignment is assured, whilst retaining the advantages of compactness in the head. If the lateral disalignment mentioned occurs between heads of less vertical disalignment than stated, the opposing horns 14 engage each other and act as guides, see Figure 4. Under some conditions the pilot lug 45 engages the adjacent wall of the opposing coupling head considerably in advance of the seating of the nose 15 in the apex of the funnel 6 of such head, and rocks the two heads towards alignment one with the other. The lug or pilot 45 is provided with a raised surface or bearing point 46 which flares into the body of the lug. The bearing may be machined to produce, and retain, a comparatively close relationship to the adjacent wall of the funnel of the opposing head when coupled. It is not believed advisable that the lug rest against such surface when the heads are mated, but that preferably it should stand a slight distance away from such wall. To avoid the lugs 45 fouling against each other, or against the rear side of the head, when the car couplers slip by on their guard arm side, I form the outer end of the lug to a radius as shown at 47, and provide it with tapered or flaring rear surfaces as at 48, Figure 2.

In side view the horn or prong 14 tapers toward and flares into the nose 15, its inclined edges 49 being joined to the head adjacent to the bearing surfaces 40, Figures 1 and 2. The nose 15 of the horn being blunt or wide it cannot, in case it strikes the gasket 19 as shown in dotted lines in Figure 1, enter or otherwise damage it. The short "stubby" formation of the horn 14, and the unusually shallow construction of the funnel 6, greatly improves the coupling action of mating heads. It allows the heads to closely approach each other before coming into engagement. This lessens the coupling angle and forces the car couplers to take part in aligning the connector heads.

As aforesaid the horn or base 14 and the cap or nose 15 may if preferred be made integral.

While I have described these parts as a base and a cap or nose it will be understood, of course, that functionally considered the horn 14 includes the cap or nose 15. At present I preferably form the horn of two parts not only to facilitate casting the head but also to more conveniently provide for hardening of the nose or cap 15 to minimize the wear thereon as it slides along the inner walls of the funnel 6 in aligning the heads during coupling. I therefore provide the prong or base 14 with an annular face 50 disposed in the vertical plane and preferably at a right angle to the longitudinal axis of the head. This face forms a bearing against which rests the complementary annular surface of the cap 15, as shown particularly in Figure 4. At its center I provide the base 14 with a perforated boss or chamber 51 formed integral with the housing 16 the base 14 and the pilot member 45. The cap 15 is preferably hollow and reinforced with radially extending ribs 52 which join the rearwardly extending centrally located cylindrically shaped shank or stem 53 of the cap, which stem is pressed into the opening in the chamber 51 or is otherwise suitably secured rigidly therein. To permit removal of the cap when worn, an opening 54 to receive a punch leads from the chamber 51 into the housing 16.

It will be understood, of course, that any suitable bracket or other supporting arrangement 55 may be employed to attach my improvement to and suspend it from the car. In this connection reference is made to my copending application Serial #502,479 filed December 15th, 1930 for Improvements in automatic train pipe couplings.

The usual train pipe hose 56 is suitably connected to the conduit 12 as by a clamp 57.

What I claim is:

1. An automatic train pipe coupling head comprising in combination, pin and funnel gathering means comprising a pin member and a funnel member, a perforated coupling face joining the pin and the funnel and extending obliquely to the longitudinal axis of the head, a centrally located housing formed integral with said coupling face and extending away from the rear side thereof, said pin having a flat front face lying in a plane at a right angle to the plane of said axis, a hollow boss connecting said flat face and said housing, a cap mounted on said flat face and having a shank occupying the opening in said boss, a conduit mounted in said housing, and means for removably retaining the conduit in place, said means including a plunger entering the housing from one side thereof into engagement with a lug on the conduit.

2. An automatic train pipe coupling head comprising in combination, gathering means of the pin and funnel type, the pin member being located on one side of the longitudinal axis of the coupling head and the funnel member on the other, the pin member being short and blunt and the funnel member being unusually shallow and relatively wide in relation to its depth for the purpose described, the funnel having at its apex an opening therethrough, spaced lugs integral with the walls of said apex and projecting into the path of said opening to form a bearing for said pin, a vertically disposed face connecting said funnel and said pin and located between the pin and said lugs and disposed obliquely to the longitudinal axis of the head, a projection extending rearwardly away from the rear side of said head between said pin and said lug, a support member pivotally connected to said projection, the projection being provided with a rear face forming a seat, a sleeve spanning said support member and its pivotal connection to said projection and resting on said seat, and a spring urging said sleeve forward to position the head relative to said supporting member, one of said lugs at the apex of said funnel having cooperative engagement with said sleeve.

3. In an automatic train pipe coupling, a coupling head of the pin and funnel type, said funnel being of a depth not greater than half of the distance across the mouth of the funnel, said pin being of a height substantially equal to the depth of the funnel, a supporting member for said head, a pivotal connection between said head and said supporting member, said pivotal connection being arranged closely adjacent the rear side of said funnel member, a sleeve surrounding said supporting member and bearing against said head, and a spring for urging said sleeve yieldably against said head.

JOSEPH ROBINSON.